United States Patent [19]

Brüstle

[11] Patent Number: 4,495,544
[45] Date of Patent: Jan. 22, 1985

[54] ELECTRIC ROLL-TYPE CAPACITOR

[75] Inventor: Walter Brüstle, Gerstetten, Fed. Rep. of Germany

[73] Assignee: Siemens Aktiengesellschaft, Berlin and Munich, Fed. Rep. of Germany

[21] Appl. No.: 508,586

[22] Filed: Jun. 28, 1983

[30] Foreign Application Priority Data

Jun. 30, 1982 [DE] Fed. Rep. of Germany ....... 3224413

[51] Int. Cl.³ .................. H01G 4/08; H01G 1/015
[52] U.S. Cl. ...................................... 361/323; 361/304
[58] Field of Search ............... 29/25.42; 361/303–315, 361/323

[56] References Cited

U.S. PATENT DOCUMENTS

| | | | |
|---|---|---|---|
| 1,952,925 | 3/1934 | Kopinski | 361/309 |
| 2,797,373 | 6/1957 | Peck | 361/323 X |
| 3,049,651 | 8/1962 | Adelson et al. | 361/323 X |
| 3,435,308 | 3/1969 | Fanning | 29/25.42 X |
| 3,530,344 | 9/1970 | Katchman | 361/312 |
| 4,110,878 | 9/1978 | Wenzel | 29/25.42 |

FOREIGN PATENT DOCUMENTS 1031890 6/1958 Fed. Rep. of Germany .
2255995 10/1980 Fed. Rep. of Germany .

*Primary Examiner*—Donald A. Griffin
*Attorney, Agent, or Firm*—Herbert L. Lerner; Laurence A. Greenberg

[57] ABSTRACT

An electric roll-type capacitor with a high capacity stability and a constant temperature coefficient, includes a dielectric formed of at least two wound shrunken plastic foils, electrodes in the form of a metal value foil and a metal cover foil wound together with the plastic foils, and connection elements electrically conductively connected to the metal foils, one of the metal foils being formed of aluminum and the other of the metal foils being formed of a metal selected from the group consisting of tin and a tin-lead alloy.

9 Claims, 1 Drawing Figure

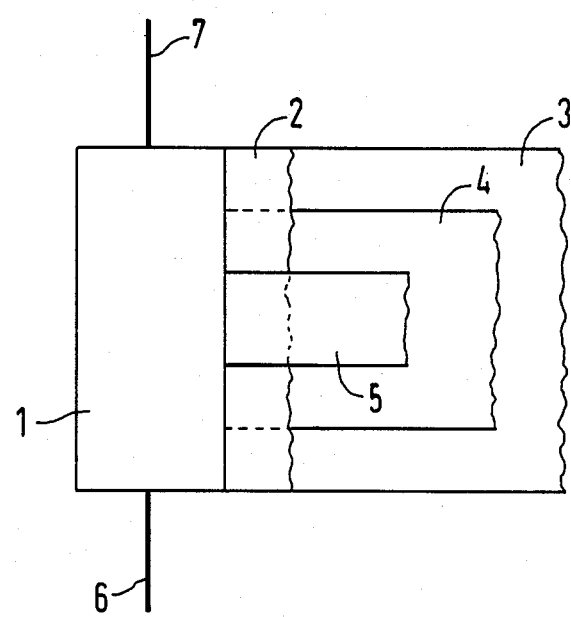

ELECTRIC ROLL-TYPE CAPACITOR

The invention relates to a roll-type or wound capacitor with a high capacity stability and a constant temperature coefficient, having a dielectric formed of at least two shrunken synthetic material foils or sheets, which are wound together with two metal foils made of different materials, one metal foil serving as the value foil and the other as the cover foil, and connection elements, especially concentric axial connection elements, electrically conductively connected with the metal foils.

A capacitor of this type with a cover foil made of aluminum and a value foil made of a silver or nickel coated or plated flat rolled copper wire, is known from German Patent DE-PS 22 55 995. This capacitor can only be produced with capacity values of a few pF. There is no information in the above-mentioned patent about a value for the temperature coefficient.

In general, capacitors of the initially mentioned type are manufactured with the cover and value foils made of the same material, as described in German Published, Prosecuted, Application DE-AS 10 31 890, for example. The dielectric foils generally are formed of stretched polystyrene bands, which are subjected to a temperature treatment (heat-treatment) which leads to the shrinking of the stretched plastic foil. This gives the winding mechanical strength, and stabilizes the essential electrical properties of the capacitor.

The cover and value foils of such capacitors are generally formed of aluminum; however, for special cases cover and value foils made of tin are also used.

Conventionally, a greater width is chosen for the cover foil than for the value foil, which makes it easier to produce the desired capacity or capacitance values.

Besides their high capacity stability, the above-described capacitors have the characteristic of having a constant temperature coefficient. The temperature coefficient $\alpha_c$ is therefore defined as follows:

$$\alpha_c = (C_2 - C_1)/C_3 \cdot (t_2 - t_1),$$

wherein $C_1$ = Capacity at temperature $t_1$;
$C_2$ = Capacity at temperature $t_2$; and
$C_3$ = Reference-capacity at $(25 \pm 10)$ °C.

It is known that the quantity for the temperature coefficient can be influenced between certain limits by the proportion of metal and synthetic foils relative to each other, and also by the degree of shrinkage during the manufacture of the capacitors. It is therefore noted that in the known capacitor structures, on one hand the desired temperature coefficient is not always obtained, and on the other hand the other properties of the capacitor are changed with different degrees of shrinkage.

For certain applications (such as integration capacitors for computer-tomographs, or for filters with matching to the temperature coefficient of ferrites) a need exists for capacitors with a narrow tolerance temperature coefficient of a defined quantity in the range of $-100 \times 10^{-6}$/K to $120 \times 10^{-6}$/K, wherein a tolerance of $\pm 20 \times 10^{-6}$/K is to be maintained over a temperature range of 0° to 50° C.

Capacitors with polystyrene foils and electrode foils of aluminum yield temperature coefficients which are too low, and capacitors with electrode foils made of tin or tin-lead alloy, respectively, result in temperature coefficients which are too high.

It is accordingly an object of the invention to provide an electric roll-type capacitor, which overcomes the hereinafore-mentioned disadvantages of the heretofore-known devices of this general type, and which is distinguished by a temperature coefficient in the range of about $-100 \times 10^{-6}$ to $-120 \times 10^{-6}$/K.

With the foregoing and other objects in view there is provided, in accordance with the invention, an electric roll-type or wound capacitor with a high capacity stability and a constant temperature coefficient, comprising a dielectric formed of at least two wound shrunken plastic foils or sheets, electrodes in the form of a metal value foil and a metal cover foil made of different material wound together with the plastic foils, and connection elements electrically conductively connected to the metal foils, one of the metal foils being formed of aluminum and the other of the metal foils being formed of a metal selected from the group consisting of tin and a tin-lead alloy.

In accordance with another feature of the invention, the connection elements are axially concentric.

In accordance with a further feature of the invention, the other metal foil is formed of a tin-lead alloy having a composition of substantially 60% tin and 40% lead.

In accordance with an added feature of the invention, the cover foil is formed of aluminum and the value foil is formed of a metal from the group consisting of tin and a tin-lead alloy.

In accordance with an additional feature of the invention, the value foil is formed of aluminum and the cover foil is formed of a metal from the group consisting of tin and a tin-lead alloy.

By coordinating the material to the value foil (inner foil) and the cover foil (outer foil), respectively, it becomes possible to influence the temperature coefficient within certain limits.

In accordance with a concomitant feature of the invention, the plastic foils are formed of polystyrene, polypropylene, polyester or polycarbonate.

Other features which are considered as characteristic for the invention are set forth in the appended claims.

Although the invention is illustrated and described herein as embodied in an electric roll-type capacitor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a fragmentary, diagrammatic top plan view of the capacitor of the invention.

Referring now to the drawing in detail, there is seen a partly rolled up capacitor roll 1. A cover foil 4 and a value foil 5 are wound together with dielectric foils or sheets 2, 3, which are made of polystyrene, for example. The sheets 2, 3 may also be formed of polypropylene, polyester or polycarbonate. Concentric axial connection elements 6, 7 are fastened to the metal foils 4, 5, by welding, for example.

Two different groups of capacitors were made with the described construction, for which the temperature coefficient in the region from 0° to 50° C. is shown as an average value with standard deviation for 20 capacitors each.

TABLE I (Capacitors with nominal values of 23,100 pF/50 V)

| Value foil | Al | SnPb |
|---|---|---|
| Cover foil | Al | SnPb |
| $a_c \cdot 10^{-6}/K$ | $-(84.0 \pm 9.5)$ | $-(135.5 \pm 10.5)$ |
| Value foil | Al | SnPb |
| Cover foil | SnPb | Al |
| $a_c \cdot 10^{-6}/K$ | $-(114.5 \pm 8.5)$ | $-(105.0 \pm 10.0)$ |

TABLE II (Capacitors with nominal values of 100,000 pF/50 V)

| Value foil | Al | SnPb |
|---|---|---|
| Cover foil | Al | SnPb |
| $a_c \cdot 10^{-6}/K$ | $-(75.5 \pm 3.5)$ | $-(148.5 \pm 2.0)$ |
| Value foil | Al | SnPb |
| Cover foil | SnPb | Al |
| $a_c \cdot 10^{-6}/K$ | $-(105.5 \pm 7.0)$ | $-(94.0 \pm 3.5)$ |

One of the foils can also be formed of tin alone, while the other is formed of aluminum.

As can be seen from the tables, the capacitors according to the invention fall in the required temperature coefficient range. Therefore, the temperature coefficient can be varied within certain limits. On one hand this is done by the proper choice of the value and cover foil, respectively, and on the other hand by the manufacturing conditions which are used.

The foregoing is a description corresponding in substance to German Application P 32 24 413.4, dated June 30, 1982, the International priority of which is being claimed for the instant application, and which is hereby made part of this application. Any material discrepancies between the foregoing specification and the aforementioned corresponding German application are to be resolved in favor of the latter.

I claim:

1. Electric roll-type capacitor with a high capacity stability and a constant temperature coefficient, comprising a dielectric formed of at least two wound shrunken plastic foils, electrodes in the form of a metal value foil and a metal cover foil each being wound between two respective plastic foils, and connection elements electrically conductively connected to said metal foils, one of said metal foils being formed of aluminum and the other of said metal foils being formed of a metal selected from the group consisting of tin and a tin-lead alloy.

2. Electric roll-type capacitor according to claim 1, wherein said connection elements are axially concentric.

3. Electric roll-type capacitor according to claim 1, wherein said other metal foil is formed of tin-lead alloy having a composition of substantially 60% tin and 40% lead.

4. Electric roll-type capacitor according to claim 1, wherein said cover foil is formed of aluminum and said value foil is formed of a metal from the group consisting of tin and a tin-lead alloy.

5. Electric roll-type capacitor according to claim 1, wherein said value foil is formed of aluminum and said cover foil is formed of a metal from the group consisting of tin and a tin-lead alloy.

6. Electric roll-type capacitor according to claim 1, wherein said plastic foils are formed of polystyrene.

7. Electric roll-type capacitor according to claim 1, wherein said plastic foils are formed of polypropylene.

8. Electric roll-type capacitor according to claim 1, wherein said plastic foils are formed of polyester.

9. Electric roll-type capacitor according to claim 1, wherein said plastic foils are formed of polycarbonate.

* * * * *